Nov. 16, 1954  W. L. MARTIN  2,694,793
DEVICE FOR DETERMINING THE STRENGTH OF A MAGNETIC FIELD
Filed Aug. 24, 1950  2 Sheets-Sheet 1

INVENTOR.
WESLYE L. MARTIN
BY
ATTORNEY

Nov. 16, 1954 W. L. MARTIN 2,694,793
DEVICE FOR DETERMINING THE STRENGTH OF A MAGNETIC FIELD
Filed Aug. 24, 1950 2 Sheets-Sheet 2

INVENTOR.
WESLYE L. MARTIN
BY
ATTORNEY

United States Patent Office 2,694,793
Patented Nov. 16, 1954

2,694,793

DEVICE FOR DETERMINING THE STRENGTH OF A MAGNETIC FIELD

Weslye L. Martin, Park Ridge, N. J., assignor to Bendix Aviation Corporation, Teterboro, N. J., a corporation of Delaware Application August 24, 1950, Serial No. 181,133

13 Claims. (Cl. 324—43)

The invention relates to devices for determining the strength of a magnetic field.

One object of the invention is to provide a device having a pickup and adapted to indicate the strength of a magnetic field irrespective of the direction of the field and without orienting the pickup.

Another object is to provide a device in which the pickup has three elements disposed mutually perpendicularly to one another to detect components of a magnetic field, such as the earth's field, parallel to the elements and to add the components vectorially and indicate the strength of the magnetic field.

Another object is to provide a device which may be used for magnetic prospecting.

The invention contemplates a device for detecting the strength of a magnetic field and having three pickup elements mutually perpendicular to one another. Voltages corresponding to the components of the magnetic field parallel to the elements are induced therein and means is provided to add the voltages so as to obtain the vector sum of the components. More specifically, the invention contemplates adding algebraically the voltages of two elements to procure the vector sum of the magnetic field components parallel thereto and using the voltage sum to energize the third element. The output of the third element is added algebraically to the voltages induced in the first two elements and the resultant has an amplitude proportional to the strength of the magnetic field, irrespective of the attitude of the elements in the field.

The foregoing and other objects and advantages of the invention will appear more fully hereinafter from a consideration of the detailed description which follows, taken together with the accompanying drawings wherein one embodiment of the invention is illustrated. It is to be expressly understood, however, that the drawings are for the purposes of illustration and description only, and are not to be construed as defining the limits of the invention.

Figure 1:
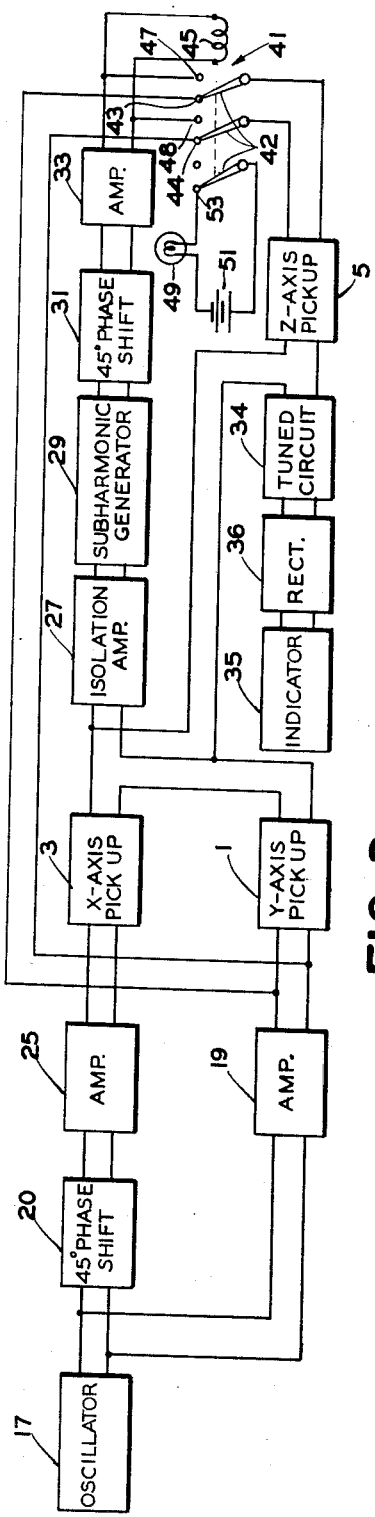
Figure 1 is a block diagram showing a device constructed according to the invention.

Referring now to the drawings for a more detailed description of the novel device of the present invention, the device includes a pickup having elements 1, 3, 5 mutually perpendicular to one another and which may be of the kind shown and described in co-pending application Serial No. 445,102, filed May 29, 1942, by John F. Emerson and assigned to the same asignee as the present invention and which is now abandoned.

Figure 3:
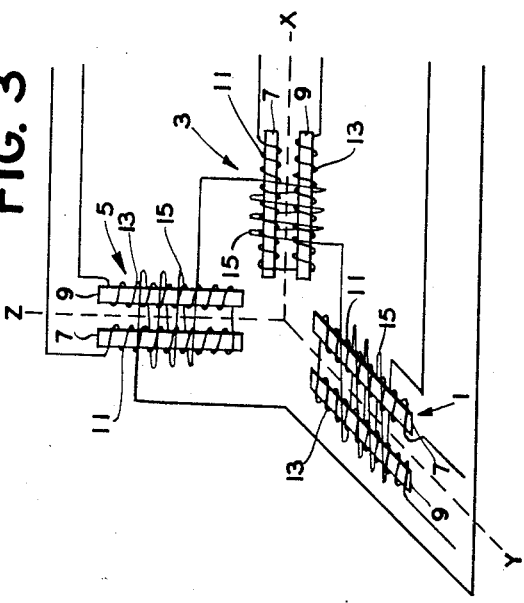
Figure 3 shows the disposition of the pickup elements.

In Figure 3, pickup element 1 is parallel to the Y axis, pickup element 3 is parallel to the X axis, and pickup element 5 is parallel to the Z axis. Each pickup element includes a pair of spaced parallel cores 7, 9 of magnetically permeable material on which are wound separate exciting or energizing windings 11, 13 connected in series opposition. An output or secondary winding 15 is wound about both core members 7, 9 and about exciting windings 11, 13.

Figure 2:
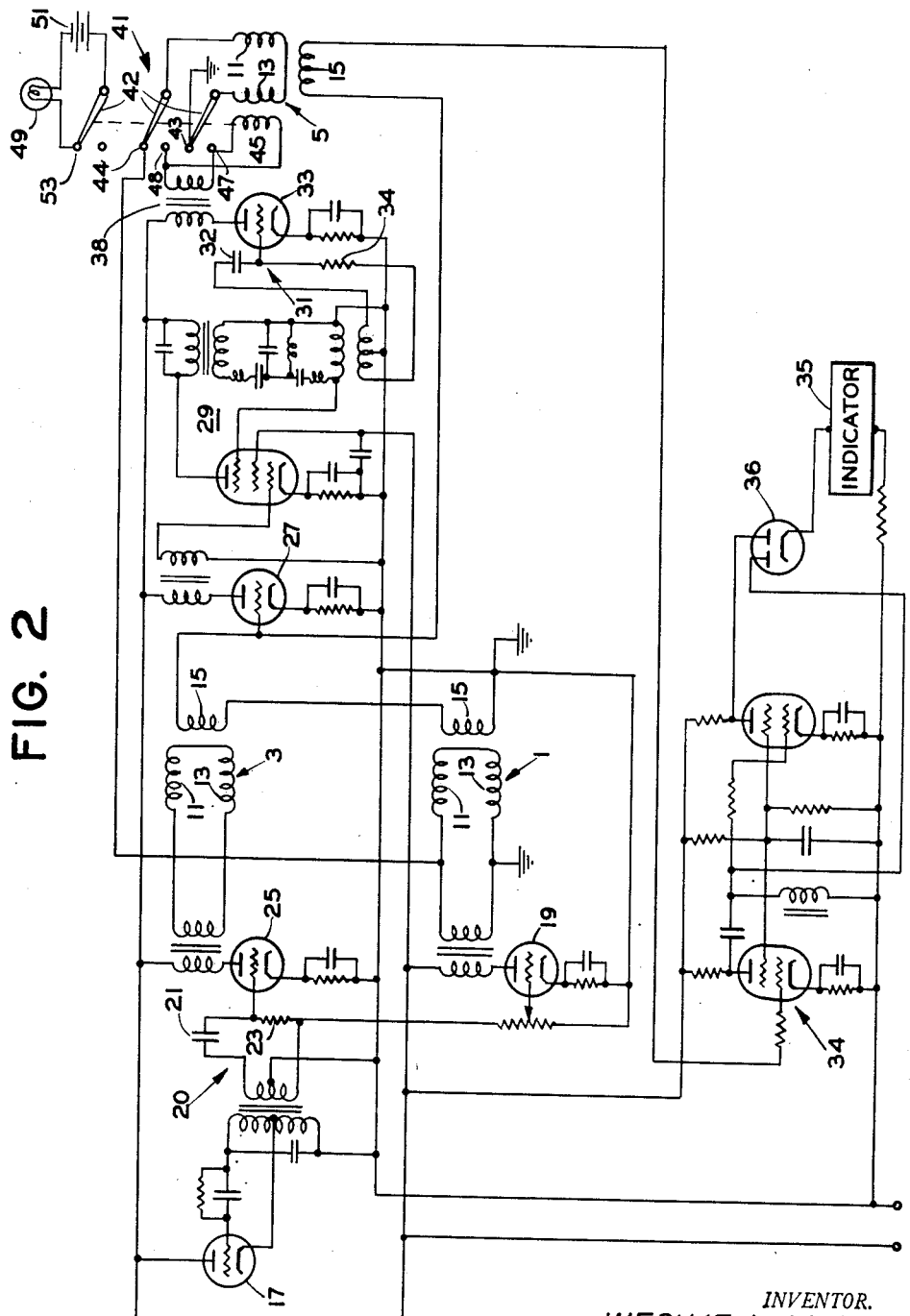
Figure 2 is a schematic wiring diagram of the device.

In Figures 1 and 2, an alternating power source, such as an oscillator 17, is connected through an amplifier 19 to the exciting windings 11, 13 of pickup element 1. Oscillator 17 is connected through a forty-five degree phase-shifting network 20, including a condenser 21 and a resistor 23, and through an amplifier 25 to the exciting windings 11, 13 of pickup element 3. Secondary windings 15 of pickup elements 1 and 3 are connected in series aiding relation to an isolation amplifier 27 which has high impedance input so as not to load pickup elements 1 and 3.

Figure 4:
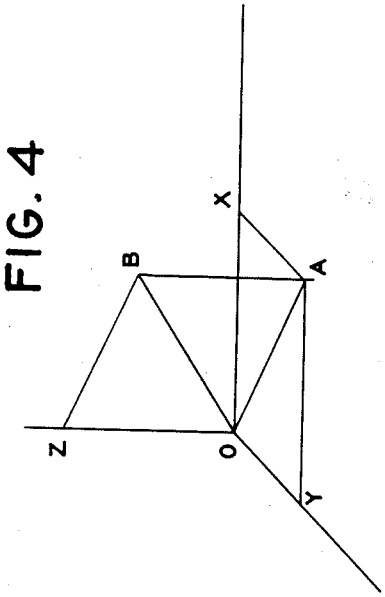
Figure 4 is a vector diagram showing the resolution of the magnetic field components parallel to the pickup elements.

In Figure 4, the amplitudes of the voltages OY, OX induced in the secondary windings 15 of pickup elements 1 and 3 are proportional to the components of the magnetic field along the Y and X axes, respectively. Voltages OY and OX are ninety degrees out of phase with one another and are added algebraically and their sum OA applied to amplifier 27 (Figures 1 and 2) corresponds in amplitude and phase to the vector sum of the components of the magnetic field parallel to the Y and X axes.

The voltages OY, OX induced in secondary windings 15 of pickup elements 1 and 3 have twice the frequency of the exciting voltage. The output of amplifier 27 is fed to a subharmonic generator 29 of any suitable kind which converts the double frequency voltages to the frequency of oscillator 17 and cooperates with a phase-shift network 31 including a condenser 32 and a resistor 34 to shift the phase of the voltage impressed thereon forty-five degrees relative to the sum OA of the outputs of pickup elements 1 and 3. Subharmonic generator 29 preferably is of the modulator type in which the output is tuned to half the frequency of the input, and a portion of the output is returned to the modulator as a modulating voltage.

The output of phase-shift network 31 is amplified by an amplifier 33 and the amplified output is applied through a transformer 38 and a relay 41 to the exciting windings 11, 13 of pickup element 5. The voltage OZ (Figure 4) induced in secondary winding 15 of pickup element 5 is ninety degrees out of phase with voltage OA and its magnitude is proportional to the component of the magnetic field parallel to the Z axis. Secondary winding 15 of pickup element 5 is connected in series-aiding relation to secondary windings 15 of pickup elements 1 and 3. This arrangement adds algebraically the voltages OA and OZ and provides a resultant voltage OB which corresponds in amplitude and phase to the strength and direction of the magnetic field. Combining voltages OX, OY and OZ in the manner described corresponds to adding vectorially the components of the magnetic field parallel to the X, Y and Z axes. The algebraic sum of the outputs OB of pickup elements 1, 3, 5 is applied to a circuit 34 tuned to twice the frequency of oscillator 17 and the output of tuned circuit 34 is rectified at 36 and impressed on a conventional logarithmic voltmeter 35 which indicates the strength of the magnetic field.

If the magnetic field is parallel to the Z axis pickup element 5, then the outputs of Y axis pickup element 1 and X axis pickup element 3 are substantially zero, and the output of amplifier 33 is insufficient to energize exciting windings 11, 13 of Z axis pickup element 5. A single throw triple pole relay 41 has contacts 43, 44, normally closed by an armature 42, to connect the exciting windings 11, 13 of Z axis pickup element 5 to the output of amplifier 19 so that, should the above condition occur, Z axis pickup element 5 is energized directly by the amplified output of oscillator 17.

Relay 41 has a winding 45 connected across the output of amplifier 33 and when the amplitude of voltage OA is such that the output of amplifier 33 is sufficient to operate the relay, then contacts 47, 48 of relay 41 are closed by armature 42 and the primary winding of Z axis pickup element 5 is connected to the output of amplifier 33. The relay is adjusted so that if the output of amplifier 33 is insufficient to operate the Z axis pickup element 5 properly, the relay will be incapable of connecting the pickup element to amplifier 33 and the pickup element will be excited by amplifier 19.

An indicator lamp 49 connected in series with a power source, such as a battery 51, is energized through contact 53, normally closed by armature 42, when the output of amplifier 33 is insufficient to energize winding 45, to indicate that the magnetic field in the X—Y plane is of insufficient strength to effect energization of pickup element 5. Lamp 49 is de-energized upon operation of relay 41.

The output of X axis pickup element 3 may be shifted in phase ninety degrees relative to the phase of the output of X axis pickup element 1 and the output of Z axis pickup element 5 may be shifted in phase ninety degrees relative to the phase of the algebraic sum of the outputs of the X and Y axis pickups in any suitable manner, and the arrangements described in application Serial No. 180,572, filed August 21, 1950, by John F. Emerson may be used for this purpose.

Also, undulating voltage may be used to energize pickup elements 1, 3 and 5 and the use of subharmonic generator 29 then may be avoided since the voltages induced in the pickups then will be of the same frequency as the undulating voltages.

The device described herein determines the strength of a magnetic field, without orienting the pickup, by detecting components of the magnetic field parallel to the elements and adding the components vectorially. The device may be used for prospecting wherein the determination of field strength is required, since the device indicates the strength of the field irrespective of the orientation of the field relative to a given plane as in devices used heretofore.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. In a device of the class described, a pickup having three elements mutually perpendicular to one another and including cores of magnetically saturable material, means to energize two of said elements so that voltages are induced therein corresponding to the components of an external unidirectional magnetic field parallel to the associated elements, means to combine the voltages induced in said two elements to procure a voltage corresponding to the vector sum of the corresponding magnetic field components and to energize the third element solely therefrom, and means to combine said last-mentioned voltage and the output of said third element to procure a voltage corresponding to the vector sum of the three magnetic field components.

2. In a device of the class described, a pickup having three fixedly mounted elements mutually perpendicular to one another and including cores of magnetically saturable material, means to energize two of said elements so that voltages are induced therein corresponding to the components of an external unidirectional magnetic field parallel to the associated elements, means to combine the voltages induced in said two elements to procure a voltage corresponding to the vector sum of the corresponding magnetic field components and to energize the third element solely therefrom, and means to combine said last-mentioned voltage and the output of said third element to procure a final voltage having an amplitude corresponding to the strength of the magnetic field, and means responsive to said final voltage to determine the strength of the magneic field.

3. In a device of the class described, a pickup having three elements mutually perpendicular to one another and including cores of magnetically saturable material with windings thereon, means to energize two of said elements so that voltages are induced in said windings ninety degrees out of phase with one another and corresponding in amplitude to the components of an external unidirectional magnetic field parallel to the associated elements, said windings of said two elements being connected in series with one another to procure a voltage sum corresponding to the vector sum of the corresponding magnetic field components, and means to energize the third element from said voltage sum and produce a voltage in the associated windings ninety degrees out of phase therewith and corresponding in amplitude to the external magnetic field parallel to the third element, said windings of the third element being connected in series with the windings of said other two elements to procure a final voltage having an amplitude corresponding to the strength of the magnetic field.

4. Structure as described in claim 3 including an indicator responsive to the amplitude of the final voltage to indicate the strength of the magnetic field.

5. In a device of the class described, a pickup having three elements mutually perpendicular to one another and including cores of magnetically saturable material with windings thereon, means producing voltages forty-five degrees out of phase with one another and connected to said windings to saturate two of said elements so that voltages are induced in the windings of said two elements having twice the frequency of the energizing voltages and corresponding to the components of an external unidirectional magnetic field parallel to said elements, the windings of said two elements being connected in series with one another to procure a voltage sum corresponding to the vector sum of the corresponding magnetic field components, a subharmonic generator connected to the outputs of said two elements and adapted to receive the voltage sum and to reduce its frequency to the frequency of the energizing voltages, means cooperating with said subharmonic generator to shift the phase of its output forty-five degrees relative to the phase of said voltage sum, the windings of said third element of said pickup being connected to said phase shifting means so that said third element is responsive to said phase-shifted voltage, and means to combine the output of said third element and the voltage sum to procure a voltage having an amplitude corresponding to the strength of the magnetic field.

6. Structure as described in claim 5 including means responsive to the voltage corresponding to the strength of the magnetic field to determine the amplitude of the voltage and indicate the strength of the magnetic field.

7. In a device of the class described, a pickup having three elements mutually perpendicular to one another and including cores of magnetically saturable material, windings on said cores, a power source, means to energize the windings of two of said elements from said power source so that voltages are induced in said elements corresponding to the components of an external unidirectional magnetic field parallel to the associated elements, means to combine the voltages induced in said two elements and to procure a voltage corresponding to the vector sum of the corresponding magnetic field components and to energize the windings of the third element therefrom to procure an output from said third element corresponding to the component of the magnetic field parallel thereto, means to combine said last-mentioned voltage and the output of said third element to procure a voltage corresponding to the vector sum of the three magnetic field components, and means for energizing the windings of the third element from the power source when the combined voltages induced in the two elements are insufficient to energize the third element.

8. Structure as described in claim 7 which includes means to indicate that the combined voltages from the two elements are insufficient to energize the third element.

9. In a device of the class described, a pickup having three elements mutually perpendicular to one another and including cores of magnetically saturable material with windings thereon, a power source, means to energize two of said elements from said power source so that voltages are induced in said windings ninety degrees out of phase with one another and corresponding to the components of an external unidirectional magnetic field parallel to the associated elements, the windings of said two elements being connected in series with one another to procure a voltage sum corresponding to the vector sum of the corresponding magnetic field components, and means to energize the third element from said voltage sum and produce a voltage in the associated windings ninety degrees out of phase therewith and corresponding to the component of the external magnetic field parallel to the third element, the windings of the third element being connected in series with the windings of said other two elements to procure a voltage having an amplitude corresponding to the strength of the magnetic field, and switching means for energizing the third element from said power source when the outputs of said other two elements are insufficient to energize the third element.

10. In a device of the class described, a pickup having three elements mutually perpendicular to one another and including cores of magnetically saturable material with windings arranged thereon, means for energizing said windings so that a voltage is induced in each of said elements corresponding in phase to the direction and in amplitude to the strength of the components of an external magnetic field parallel to the element, and means connecting said elements to combine the voltages induced in said elements to procure a voltage corresponding to the vector sum of the magnetic field components.

11. Structure as described in claim 10 including indicating means responsive to the amplitude of the voltage corresponding to the vector sum of the three magnetic field components and calibrated to indicate the strength of the magnetic field.

12. In a device of the class described, a pick-up having three elements mutually perpendicular to one another and including cores of magnetically saturable material with windings arranged thereon, means for energizing said windings so that a voltage is induced in each of said elements corresponding in phase to the direction and in amplitude to the strength of the component of an external unidirectional magnetic field parallel to the element, means connecting said elements to combine the voltages induced in said elements to procure the vector sum of said voltages, and means responsive to the amplitude of the vector sum to determine the strength of the magnetic field.

13. In a device of the class described, a pick-up having three elements mutually perpendicular to one another and including cores of magnetically saturable material, windings on said elements, means to energize the windings of two of said elements so that a voltage is induced in the windings of each of said elements corresponding in phase to the direction and in amplitude to the strength of the component of an external unidirectional magnetic field parallel to the element, means to combine the voltages in said two elements to procure a voltage corresponding to the vector sum of the corresponding magnetic field components and to energize the windings of the third element therefrom, and means to combine said last mentioned voltage and the output of said third element to procure a voltage corresponding to the vector sum of the three magnetic field components.

References Cited in the file of this patent

UNITED STATES PATENTS

| Number | Name | Date |
|---|---|---|
| 2,427,666 | Felch et al. | Sept. 23, 1947 |
| 2,438,964 | Cunningham et al. | Apr. 6, 1948 |
| 2,468,554 | Hull | Apr. 26, 1949 |
| 2,485,931 | Slonczewski | Oct. 25, 1949 |
| 2,488,389 | Felch et al. | Nov. 15, 1949 |